(12) United States Patent
Faust et al.

(10) Patent No.: US 7,226,979 B2
(45) Date of Patent: Jun. 5, 2007

(54) COPOLYMERS COMPRISING OLEFIN AND PROTECTED OR UNPROTECTED HYDROXYSTYRENE UNITS

(75) Inventors: Rudolf Faust, Lexington, MA (US); Laszlo Sipos, Dracut, MA (US)

(73) Assignee: University of Massachusetts Lowell, Lowell, MA (US)

(*) Notice: Subject to any disclaimer, the term of this patent is extended or adjusted under 35 U.S.C. 154(b) by 172 days.

(21) Appl. No.: 10/776,674

(22) Filed: Feb. 11, 2004

(65) Prior Publication Data
US 2005/0176891 A1    Aug. 11, 2005

(51) Int. Cl.
C08F 297/00    (2006.01)
C08F 212/14    (2006.01)

(52) U.S. Cl. ............... 525/298; 525/245; 525/270; 525/288; 525/299; 525/312; 525/326.5; 525/328.8; 525/328.9; 526/135; 526/279; 526/313

(58) Field of Classification Search ............... 525/298, 525/299, 245, 270, 288, 312, 326.5, 328.8, 525/328.9; 526/313, 135, 279
See application file for complete search history.

(56) References Cited

U.S. PATENT DOCUMENTS

| | | | |
|---|---|---|---|
| 4,129,557 A | 12/1978 | Kudo et al. | |
| 4,182,803 A * | 1/1980 | Kanagawa et al. | 526/313 |
| 4,182,818 A | 1/1980 | Tung et al. | |
| 4,568,732 A | 2/1986 | Kennedy et al. | |
| 4,910,321 A | 3/1990 | Kennedy et al. | |
| 4,965,340 A | 10/1990 | Matsuda | |
| 5,122,572 A | 6/1992 | Kennedy et al. | |
| 5,428,111 A | 6/1995 | Faust et al. | |
| 5,451,647 A | 9/1995 | Faust et al. | |
| 5,637,647 A | 6/1997 | Faust | |
| 5,665,837 A | 9/1997 | Faust et al. | |
| 5,677,386 A | 10/1997 | Faust | |
| 5,690,861 A | 11/1997 | Faust | |
| 5,700,625 A | 12/1997 | Sato et al. | |
| 5,777,044 A | 7/1998 | Faust | |
| 5,981,785 A | 11/1999 | Faust et al. | |
| 6,025,437 A | 2/2000 | Hirahara et al. | |
| 6,046,281 A | 4/2000 | Faust et al. | |
| 6,051,657 A | 4/2000 | Faust et al. | |
| 6,194,597 B1 | 2/2001 | Faust et al. | |
| 6,268,451 B1 | 7/2001 | Faust et al. | |
| 6,469,115 B1 | 10/2002 | Faust et al. | |
| 6,750,267 B2 | 6/2004 | Faust et al. | |
| 2001/0047069 A1 | 11/2001 | Chung et al. | |
| 2002/0107330 A1 | 8/2002 | Pinchuk et al. | |
| 2003/0235602 A1 | 12/2003 | Schwarz | |

FOREIGN PATENT DOCUMENTS

| | | |
|---|---|---|
| CA | 2040457 A1 * | 10/1991 |
| EP | 0 024 120 | 2/1981 |
| EP | 0 379 250 A | 7/1990 |
| EP | 0 877 294 | 11/1998 |
| EP | 0 931 581 | 7/1999 |
| JP | 50092877 | 7/1975 |
| JP | 63049228 | 3/1988 |
| JP | 11176750 | 7/1999 |
| WO | WO 93/02110 | 2/1993 |
| WO | WO 95/17436 | 6/1995 |
| WO | WO 99/09074 | 2/1999 |
| WO | WO 99/24480 | 5/1999 |
| WO | WO 00/32609 | 6/2000 |
| WO | WO 00/32654 | 6/2000 |
| WO | WO 00/63256 | 10/2000 |
| WO | WO 01/87999 | 11/2001 |
| WO | WO 02/28924 | 4/2002 |
| WO | WO 03/011596 | 2/2003 |
| WO | WO 04/113400 | 12/2004 |
| WO | WO 05/012373 | 2/2005 |

OTHER PUBLICATIONS

Jankova, et al, Synthesis by ATRP of poly(ethylene-co-butylene)-block-polystyrene, poly(ethylene-co-butylene)-block-poly(4-acetoxystyrene) and its hydrolysis product poly(ethylene-co-butylene)-block-poly(hydroxystyrene), Macromol. Rapid Commun., 20, 219-223 (1999).*

Allen, RD, et al. Preparation of High Purity, Anionic Polymerization Grade Alkyl Methacrylate Monomers. *Polymer Bull.*, 1986, 15:127-34.

Asthana, A, et al. Star-block Polymers of Multiple Polystyrene-b-polyisobutylene Arms Radiating from a Polydivinylbenzene Core. *J. Polymer. Sci. Part A: Polym. Chem.*, 1999, 37:2235-43.

Auschra, C, et al. Synthesis of Block Copolymers with Poly(methyl methacrylate): P(B-b-MMA), P(EB-b-MMA), P(S-b-B-b-MMA) and P(S-b-EB-b-MMA). *Polymer Bull.*, 1993, 30:257-64.

Bae, YC, et al. Halogen-free Polyisobutylene by in situ Methylation of Living Polyisobutylene Using Dimethyl Zinc. *Polymer Bull.*, 2000, 44:453-59.

Bae, YC, et al. Addition Reaction of Living Polyisobutylene to "Double" Diphenylethylenes. Synthesis of 1,1-Diphenylethylene-Functionalized Polyisobutylene Macromonomers. *Macromolecules*, 1998, 31:9379-83.

Bae, YC, et al. Living Coupling Reaction in Living Castionic Polymerization. 2. Synthesis and Characterization of Amphiphilic $A_2B_2$ Star-Block Copolymer: Poly[bis(isobutylene)-*star*-bis(methyl vinyl ether)]. *Macromolecules*, 1998, 31,2480-87.

Chen, X, et al. Block Copolymers of Styrene and p-acetoxystyrene with Polyisobutylene by Combination of Living Carbocationic and Atom Transfer Radical Polymerizations. *Macromol. Chem., Rapid Commun.*, 1998, 19:585-89.

(Continued)

Primary Examiner—Fred Teskin
(74) Attorney, Agent, or Firm—Lahive & Cockfield, LLP (57) ABSTRACT

Novel copolymers, including block copolymers, which comprise: (a) a plurality of constitutional units that correspond to one or more olefin monomer species and (b) a plurality of constitutional units that correspond to one or more protected or unprotected hydroxystyrene monomer species.

36 Claims, 1 Drawing Sheet

OTHER PUBLICATIONS

Coca, S, et al. Block Copolymers by Transformation of "Living" Carbocationic into "Living" Radical Polymerization. II. ABA-type Block Copolymers Comprising Rubbery Polyisobutylene Middle Segment. *J. Polymer. Sci. Part A: Polym. Chem.*, 1997, 35(16):3595-3601.

Falkenhagen, J, et al. Characterization of Block Copolymers by Liquid Adsorption Chromatography at Critical Conditions. 1. Diblock Copolymers. *Macromolecules*, 2000, 33:3687-93.

Faust, R, et al. Living Carbocationic Polymerization. III. Demonstration of the Living Polymerization of Isobutylene. *Polym. Bull.*, 1986,15:317-23.

Feldthusen, J, et al. Synthesis of Liner and Star-Shaped Block Copolymers of Isobutylene and Methacrylates by combination of Living Cationic and Anionic Polymerizations. *Macromolecules*, 1998, 31:578-85.

Feldthusen, J, et al. Stable Carbanions by Quantitative Metalation on Cationically Obtained Diphenylvinyl and Diphenylmethoxy Compounds: New Initiators for Living Anionic Polymerizations. *Macromolecules*, 1997, 30 :6989-93.

Fishbein, L, et al. The Relationship of Structure to Some Physical and Mechanical Properties of Poly (vinyl alkyl ethers). *Makromol Chem.*, 1961, 48:221-28.

Fodor, Z, et al. Polyisobutylene-based Thermoplastic Elastomers. II. Synthesis and Characterization of Poly(*p*-methylstyrene-*block*-isobutylene-block-*p*-methylstyrene) Triblock Copolymers. *J. Macromol. Sci., Pure Appl. Chem.*, 1995, A32(3):575-91.

Fodor, Z, et al. Synthetic Applications of Non-polymerizable Monomers in Living Carbocationic Polymerization. *Polymer Preprints*, 1994, 35(2): 492-93.

Fodor, Z, et al. Living Carbocationic Polymerization of *p*-methylstyrene and Sequential Block Copolymerization of Isobutylene with *p*-Methylstyrene. *J. Macromol. Sci., Pure Appl. Chem.*, 1994, A31(12):1985-2000.

Gyor, M; et al. Polyisobutylene-based Thermoplastic Elastomers. I. Synthesis and Characterization of Polystyrene-Polyisobutylene-Polystyrene Triblock Copolymers. *J. Macromol Sci.*, 1994, A31(12):2055-65.

Gyor, M, et al. Living Carbocationic Polymerization of Isobutylene with Blocked Bifunctional Initiators in the Presence of di-*tert*-butylpyridine as a Proton Trap. *J. Macromol. Sci., Pure Appl. Chem.*, 1992, A29(8):639-53.

Hadjikyriacou, S; et al. Living Coupling Reaction in Living Cationic Polymerization. 3. Coupling Reaction of Living Polyisobutylene Using Bis(furanyl) Derivatives. *Macromolecules* 2000, 33:730-33.

Hadjikyriacou, S; et al. Cationic Macromolecular Design and Synthesis Using Furan Derivatives. *Macromolecules* 1999, 32:6393-99.

Hadjikyriacou, S, et al. Amphiphilic Block Copolymers by Sequential Living Cationic Polymerization: Synthesis and Characterization of Poly(isobutylene-*b*-methyl vinyl ether) *Macromolecules*, 1996, 29:5261-67.

Hadjikyriacou, S, et al. Living Cationic Homopolymerization of Isobutyl Vinyl Ether as Sequential Block Copolymerization of Isobutylene with Isobutyl Vinyl Ether. Synthesis and Mechanistic Studies. *Macromolecules*, 1995, 28:7893-7900.

Hadjikyriacou, S, et al. Synthetic Applications of Nonpolymerizable Monomers in Living Cationic Polymerization: Functional Polyisobutylenes by End-quenching. *J. Macromol. Sci., Pure Appl. Chem.* 1995, A32(6):1137-53.

Higashimura, T, et al. Living Cationic Polymerization of 4-*tert*-butoxystyrene and Synthesis of Poly(4-vinylphenol) with Narrow Molecular Weight Distribution. *Makromol. Chem., Suppl.* 1989, 15:127-36.

Hirai, A, et al. Polymerization of Monomers Containing Functional Groups Protected by Trialkylsilyl Groups. 1. Synthesis of Poly(4-vinylphenol) by Means of Anionic Living Polymerization. *Makromol. Chem., Rapid Commun.*, 1982, 3:941-46.

Hirao, A, et al. Polymerization of Monomers Containing Functional Groups Protected by Trialkylsilyl Groups. 5. Synthesis of Poly(20hydroxyethyl methacrylate) with a Narrow Molecular Weight Distribution by Means of Anionic Living Polymerization. *Macromolecules*, 1986, 19:1294-99.

Hsieh, HL, et al. *Anionic Polymerization*. NY: Marcel Dekker, 1996, pp. 307-392, 447-605, and 641-684.

Jung, MEM et al. Generation of the Enolate of Acetaldehyde from Non-carbonyl Substances and C-alkylation, O-acylation and O-silylation. *Tetrahedon Lett.*, 1977, 43:3791-94.

Kaszas, G, et al. Quasiliving Carbocationic Polymerization. XII. Forced Ideal Copolymerization of Isobutylene with Styrene. *J. Macromol. Sci.-Chem.*, 1982-3, A18(9):1367-82.

Kaszas, G, et al. Polyisobutylene-containing Block Polymers by Sequential Monomer Addition. II. Polystyrene-Polyisobutylene-Polystyrene Triblock Polymers: Synthesis, Characterization, and Physical Properties. *J. Polym. Sci., Polym. Chem. Ed.*, 1991, A29(1):427-35.

Kennedy, JP, et al. Polyisobutylene-containing Block Polymers by Sequential Monomer Addition. 8. Synthesis, Characterization, and Physical Properties of Poly(indene-*b*-isobutylene-*b*-indene) Thermoplastic Elastomers. *Macromolecules*, 1993, 26:429-35.

Kim, MS, et al. Synthesis of Poly(ε-caprolactone-*b*-isobutylene) Diblock Copolymer and Poly(ε-caprolactone-*b*-iosbutylene-*b*-ε-caprolactone) Triblock Copolymer. *Polym. Bull.*, 2002, 48(2), 127.

Kitayama, T, et al. PMMA-*block*-polyisobutylene-*block*-PMMA Prepared with α,ω-dilithiated Polyisobutylene and its Characterization. *Polymer Bull.*, 1991, 26:513-20.

Kurian, J, Living Carbocationic Polymerization of p-halostyrenes and Synthesis of Novel Thermoplastic Elastomers. Ph.D. Thesis, The University of Akron., 1991.

Kwon, Y, et al. Synthesis and Characterization of Poly(isobutylene-*b*-pivalolactone) Diblock and Poly(pivalolactone-*b*-isobutylene-*b*-pivalolactone) Triblock Copolymers. *Macromolecules*, 2002, 35:3348.

Ledwith, A, et al. Absolute Reactivity in the Cationic Polymerization of Methyl and Other Alkyl Vinyl Ethers. *Polymer*, 1975, 16(1):31-37.

Li, D, et al. Polyisobutylene-based Thermoplastic Elastomers. 3. Synthesis, Characterization, and Properties of Poly(α-methylstyrene-*b*-isobutylene-*b*-α-methylstyrene) Triblock Copolymers. *Macromolecules*, 1995, 28:4893-98.

Li, D, et al. Living Carbocationic Sequential Block Copolymerization of Isobutylene with α-methylstyrene. *Macromolecules*, 1995, 28:1383-89.

Lubnin, AV, et al. Living Carbocationic Polymerization of Isobutyl Vinyl Ether and the Synthesis of Poly[isobutylene-*b*-(isobutyl vinyl ether)]. *J. Polymer. Sci. Part A: Polym. Chem.*, 1993, 31:2825-34.

Martinez-Castro, N, et al. Polyisobutylene Stars and Polyisobutylene-*block*-Poly(*tert*-Butyl Methacrylate) Block Copolymers by Site Transformation of Thiophene End-Capped Polyisobutylene Chain Ends. *Macromolecules*, 2003, 36:6985-94.

Miyamoto, M, et al. Living Polymerization of Isobutyl Vinyl Ether with the Hydrogen Iodide/Iodine Initiating System. *Macromolecules*, 1984, 17(3):265-68.

Mori, H, et al. Protection and Polymerization of Functional Monomers. 23. Synthesis of a Well-defined Poly(2-hydroxyethyl methacrylate) by Means of Anionic Living Polymerization of Protected Monomers. *Macromol. Chem. Phys.*, 1994, 195:3213-24.

Ohgi, H, et al. Highly Isotactic Poly(vinyl alcohol). 2. Preparation and Characterization of Isotactic Poly(vinyl alcohol). *Macromolecules*, 1999, 32:2403.

Okamura, S, et al. The Cationic Polymerization of *t*-Butyl Vinyl Ether at Low Temperature and the Conversion into Polyvinyl Alcohol of Poly-*t*-butyl Vinyl Ether. *Makromol. Chem.*, 1962, 53:180-91.

Pasch, H. Liquid Chromatography at the Critical Point of Adsorption—A New Technique for Polymer Characterization. *Macromol. Symp.*, 1996, 110:107-20.

Pasch, H, et al., Chromatographic Investigations of Molecules in the Critical Range of Liquid Chromatography. 4. Analysis of Poly(styrene-*b*-methyl methacrylate). *Polymer*, 1993, 34(19):4100-04.

Pernecker, T, et al. Living Carbocationic Polymerization. 48. Poly(isobutylene-*b*-methyl vinyl ether). *Macromolecules*, 1992, 25:1642-47.

Puskas, JE, et al., Living Carbocationic Polymerization of Resonance-stabilized Monomers. *Prog. Polym. Sci.*, 2000, 25:403-52.

Quirk, RP, et al. Anionic Synthesis of Block and Star-Branched Polymers via 1,1-Diphenylethylene-functionalized Macromonomers. Polymer Preprints, 1996, 37(2): 402-03.

Radke, W, et al. Simulation of GPC-distribution Coefficients of Linear and Star-shaped Molecules in Spherical Pores. 2. Comparison of Simulation and Experiment. *Polymer*, 2003, 44:519-25.

Reed, PJ, et al. The Preparation and Analysis of High Purity Organolithium Initiators. *J. Organomet. Chem.*, 1972, 39:1-10.

Rembaum, A, et al. Decomposition of Ethyllithium in Tetrahydrofuran. J. Polymer Sci., 1962, 56:S17-S19.

Roovers, Jel, et al. Preparation and Characterization of Four-branched Star Polystyrene. *Macromolecules*, 1972, 5:384-88.

Ruth, WG, et al. Silicon-mediated synthesis of new amphiphilic oligomers. *J. Polymer Sci., Part A*, 1997, 35: 163-70.

Ruth, WG, et al. Synthesis of poly(tert-butyldimethylsilyl vinyl ether block copolymers using silyl aldol polymerization. *Polymer Preprints*, 1993, 34(2): 584-5.

Satoh, K, et al. Direct Synthesis of Amphiphilic Random and Block Copolymers of p-hydroxystyrene and p-methoxystyrene via Living Cationic Polymerization with $BF_3OEt_2$/ROH Systems. *Macromolecules*, 2000, 33(16):5830-35.

Satoh, K, et al. Direct Living Cationic Polymerization of p-hydroxystyrene with Boron Trifluoride Etherate in the Presense of Water. *Macromolecules*, 2000, 33(15):5405-10.

Schlaad, H, et al. Kinetic Studies on the Capping Reaction of Living Polyisobutylene with 1,1-diphenylethylene. 1. Effect of Temperature and Comparison to the Model Compound 2-chloro-2,4,4-trimethylpentane. *Macromolecules*, 1998, 31:8058-62.

Shibasaki, Y., et al. Reduction of the Cationic Growing Center of Polyisobutylene by Activated Magnesium. Block Copolymerization of Isobutylene with *tert*-butyl Methacrylate. *Macromol. Chem. Phys.*, 1998, 199(11):2619-23.

Sipos, L, et al. Synthesis of Poly(*L*-lactide)-*block*polyisobutylene-*block*-poly(*L*-lactide), a New Biodegradable Thermoplastic Elastomer. *Macromol. Rapid Commun.*, 1995, 16(12):935-40.

Storey, RF, et al. Aspects of the Synthesis of Poly(styrene-*b*-isobutylene-*b*-styrene) Block Copolymers Using Living Carbocationic Polymerization. *Macromolecules*, 1993, 26:6727-33.

Tsunogae, Y, et al. Polyisobutylene-containing Block Polymers by Sequential Monomer Addition. X. Synthesis of Poly($\alpha$-methylstyrene-*b*-isobutylene-*b*-$\alpha$-methylstyrene) Thermoplastic Elastomers. *J. Polym. Sci., Polym. Chem. Ed.* 1994, A32:403-12.

Zhou, Y, et al. Synthesis of poly(isobutylene-b-tert-butyl vinyl ether) and poly(isobutylene-b-tert-butyldimethylsilyl vinyl ether) dublock copolymers. Polymer Preprints, 2003, 44(2): 661-2.

\* cited by examiner

Fig. 1

COPOLYMERS COMPRISING OLEFIN AND PROTECTED OR UNPROTECTED HYDROXYSTYRENE UNITS

BACKGROUND OF THE INVENTION

As is well known, polymers are molecules containing one or more chains, each containing multiple copies of one or more constitutional units. An example of a common polymer is polystyrene where n is an integer, typically an integer of 10 or more, more typically on the order of 10's, 100's, 1000's or even more, in which the constitutional units in the chain correspond to styrene monomers:

(i.e., they originate from, or have the appearance of originating from, the polymerization of styrene monomers, in this case the addition polymerization of styrene monomers).

Copolymers are polymers that contain at least two dissimilar constitutional units. Copolymers are an important class of polymers and have numerous commercial applications. For instance, their unique properties, whether in pure form, in blends, in melts, in solutions, etc., lead to their use in a wide range of products, for example, as compatibilizers, adhesives, dispersants, and so forth. Because each copolymer has its own unique properties, there is continuing demand for novel copolymers, which can be used in products such as those above.

It is well known that living polymerization (i.e., polymerization proceeding in the practical absence of chain transfer to monomer and irreversible termination) is a very useful method for designing polymer structures. One of the most useful features of living polymerizations is the ability to prepare block copolymers. Living cationic sequential block copolymerization is generally recognized as one of the simplest and most convenient methods to provide well-defined block copolymers with high structural integrity.

Linear-, star-, and arborescent-block copolymers with a rubbery polyisobutylene (PIB) center block and glassy end blocks are useful thermoplastic elastomers, exhibiting excellent properties such as thermal and oxidative stability and biocompatibility. To date a large number of these block copolymers with polystyrene, poly(p-methylstyrene), poly(p-tert-butylstyrene), poly(p-chlorostyrene), poly(p-fluorostyrene), poly(α-methylstyrene) and polyindene as end blocks have been prepared.

All of the above thermoplastic elastomers contain a hydrophobic end blocks. Some applications, however, require block copolymers where the end blocks are hydrophilic. The ability to tune the overall hydrophilicity of the block copolymer would provide a wide range of useful products.

Although the living homopolymerization and copolymerization of p-hydroxystyrene and p-tert-butoxystyrene has been reported with $BF_3.OEt_2$ coinitiator in the presence of a large amount of water in $MeCN/CH_2Cl_2$ solvent at 0° C., see Satoh, Kotaro; Kamigaito, Masami; and Sawamoto, Mitsuo, Department of Polymer Chemistry Graduate School of Engineering, Kyoto University, Kyoto, Japan, *Macromolecules* (2000), 33(16), 5830, this system is not applicable for the living polymerization of isobutylene. Cationic living polymerization of p-tert-butoxystyrene has also been reported in aqueous emulsion polymerization and by the $HI/ZnI_2$ initiating system in toluene or $CH_2Cl_2$. Higashimura, T.; Kojima, K.; Sawamoto, M., *Makromolekulare Chemie*, Supplement 1989, 15, 127. The $HI/ZnI_2$ initiating system, however, is inactive for the polymerization of isobutylene (IB).

SUMMARY OF THE INVENTION

According to an aspect of the present invention, a copolymer is provided, which comprises: (a) a plurality of constitutional units that correspond to one or more olefin monomer species and (b) a plurality of constitutional units that correspond to one or more protected or unprotected hydroxystyrene monomer species.

In some embodiments, the copolymer is a block copolymer that comprises: (a) one or more olefin blocks that comprise a plurality of constitutional units corresponding to the one or more olefin monomer species and (b) one or more styrenic blocks that comprise a plurality of constitutional units corresponding to the protected or unprotected hydroxystyrene monomer species.

As used herein a polymer "block" is a grouping of 10 or more constitutional units, commonly 20 or more, 50 or more, 100 or more, 200 or more, 500 or more, or even 1000 or more units. A block can be branched or unbranched. A "chain" is a linear (unbranched) grouping of 10 or more constitutional units (i.e., a linear block). In certain embodiments, the copolymer is a block copolymer of the formula $X(POL-C-PST)_n$, where X corresponds to an initiator species, C corresponds to a capping species, POL is an olefin block that contains a plurality of constitutional units corresponding to the one or more olefin monomer species, PST is a styrenic block that contains a plurality of constitutional units corresponding to the one or more protected or unprotected hydroxystyrene monomer species, and n is a positive whole number ranging from 1 to 5. Other aspects of the present invention are directed to methods of making the above copolymers. These methods comprise: (a) providing a polymer that contains one or more carbocationically terminated olefin blocks; (b) contacting the polymer with a capping species that does not homopolymerize under the reaction conditions employed, thereby forming a polymer containing one or more carbocationically terminated end-caps; and (c) contacting the end-capped polymer with one or more protected hydroxystyrene monomer species under reaction conditions that are of lower Lewis acidity than the reaction conditions of step (b).

In embodiments of the invention where one or more hydrolysable protected hydroxystyrene monomer species are incorporated into a copolymer, at least a portion of the incorporated monomer species may be hydrolyzed, thereby forming hydroxyl groups.

An advantage of the present invention is that novel copolymers can be produced, which can be used in a variety of commercial applications.

Another advantage of the present invention is that novel copolymers can be produced, which are capable of being hydrolyzed, thereby forming further novel polymers of increased hydrophilicity.

The above and other embodiments, aspects and examples of the present invention will become readily apparent to those of ordinary skill in the art in view of the disclosure herein.

DETAILED DESCRIPTION OF THE INVENTION

In some aspects of the present invention, copolymers are provided, which comprise (a) a plurality of constitutional units that correspond to one or more olefin monomer species and (b) a plurality of constitutional units that correspond to one or more protected or unprotected hydroxystyrene monomer species. Typically, each of these constitutional units occurs within the copolymer molecule at a frequency of at least 10 times, and more typically at least 50, 100, 500, 1000 or more times.

Examples of olefin monomer species for use in connection with the present invention include isomonoolefins with 4 to 18 carbon atoms per molecule and multiolefins with 4 to 14 carbon atoms per molecule, for instance, isobutylene, 2-methylbutene, isoprene, 3-methyl-1-butene, 4-methyl-1-pentene, beta-pinene, and the like.

Examples of hydroxystyrene monomer species include 2-hydroxystyrene, 3-hydroxystyrene, 4-hydroxystyrene, 2,3-dihydroxystryene, 2,4-dihydroxystryene, and 3,4-dihydroxystryene species.

Examples of protected hydroxystyrene monomer species include styrene species substituted with one or more functional groups that are stable under cationic polymerization conditions, but which are hydrolysable into hydroxyl groups, for example, under the influence of acids or bases. Protected hydroxystyrene monomer species in accordance with the present invention are generally substituted with either (a) one or more R—O— groups, wherein R is a hydrocarbon group, typically containing from 1 to 12 carbons, including branched alkyl groups, cycloalkyl groups and alkylaryl groups or (b) one or more groups, where $R_1$, $R_2$, $R_3$ can be the same or different and are hydrocarbon groups, typically containing from 1 to 4 carbons, including unbranched alkyl groups, branched alkyl groups, cycloalkyl groups, and alkylaryl groups. Specific examples of protected hydroxystyrene monomers include tert-butyl protected hydroxystyrene (tert-butoxystyrene), benzyl protected hydroxystyrene (benzyloxystyrene), cyclohexyl protected hydroxystyrene (cyclohexoxystyrene), neopentyl protected hydroxystyrene (neopentoxystyrene), acetyl protected hydroxystyrene (acetoxystyrene), tert-butyldimethylsilyl protected hydroxystyrene (tert-butyldimethylsilyloxystyrene) and so forth. The protected hydroxyl groups in the styrene monomer species of the present invention can be substituted at the 2-, 3- or 4-positions, at the 2,3-, 2,4- and 3,4-positions, and so forth. Commonly, the protected hydroxyl groups in the styrene monomer species of the present invention are substituted at the 4-position.

The copolymers of the present invention embrace a variety of configurations, for example, cyclic, linear and branched configurations. Branched configurations include star-shaped configurations (e.g., radial configurations in which three or more chains emanate from a single region), comb configurations (e.g., graft copolymers having a main chain and a plurality of side chains), and dendritic configurations (e.g., arborescent or hyperbranched copolymers). The copolymers of the present invention embrace (a) one or more chains containing repeating constitutional units of a single type, (b) one or more chains containing randomly distributed constitutional units of two or more types (e.g., random or statistical copolymers), (c) one or more chains containing two or more types of constitutional units that repeat within an ongoing series (e.g., alternating copolymers), and so forth.

For example, in certain beneficial embodiments, the copolymers of the present invention are block copolymers containing (a) one or more olefin blocks, each of which contains a plurality of units corresponding to olefin monomer species, and (b) one or more styrenic blocks, each of which contains a plurality of units that correspond to protected or unprotected hydroxystyrene monomer species. Examples of olefin monomer species and protected and unprotected hydroxystyrene monomer species are discussed above.

The number average molecular weight (Mn) of the block copolymers of the present invention typically range, for example, from about 1000 to about 2,000,000, more typically from about 10,000 to about 500,000, even more typically 50,000 to 200,000, with the protected or unprotected hydroxystyrene units typically comprising 10 to 90 mol %, more typically 10 to 50 mol %, even more typically .13 to 28 mol % of the copolymer. In some embodiments, polymers have a narrow molecular weight distribution such that the ratio of weight average molecular weight to number average molecular weight (Mw/Mn) (i.e., the polydispersity index) of the polymers ranges from about 1.1 to 1.5, or even from about 1.05 to 1.3.

In some embodiments of the present invention, block copolymers are formed by the sequential monomer addition technique using an olefin monomer species and a protected hydroxystyrene monomer species, such as those discussed above.

Synthesis of block copolymers via sequential monomer addition typically relies, for example, on the rational selection of polymerization conditions such as Lewis acid, solvent, additives, temperature, and so forth, as well as on the selection of the appropriate order of monomer addition. For a successful living cationic sequential block copolymerization the rate of crossover to a second monomer ($R_{cr}$) should be faster than or at least equal to that of the homopolymerization of a second monomer ($R_p$). Generally, efficient crossover is achieved when the two sequential monomers have similar reactivities, or when crossover occurs from the more reactive to the less reactive monomer. On the other hand, when crossover is from the less reactive monomer to the more reactive one, a mixture of block copolymer and homopolymer is generally formed due to the unfavorable $R_{cr}/R_p$ ratio.

Because the cationic reactivity of certain protected hydroxylstyrenes, for example, p-tert-butoxystyrene and p-tert-butyldimethylsilyloxystyrene, is expected to be much higher than that of olefins such as isobutylene, simple sequential monomer addition generally cannot used for the preparation of the block copolymers of the present invention. Accordingly, copolymers in accordance with the present invention are made in certain embodiments by a process that includes: (a) providing a polymer that contains one or more carbocationically terminated olefin blocks, which blocks contain a plurality of units that correspond to olefin monomer species; (b) contacting the carbocationically terminated polymer with a capping species that does not homopolymerize under the reaction conditions employed, thereby forming an end-capped carbocationically terminated polymer; and (c) contacting the end-capped carbocationically terminated polymer with a protected hydroxystyrene monomer species under reaction conditions that are of lower Lewis acidity than the reaction conditions of step (b). For example, as discussed further below, step (b) can be conducted using $TiCl_4$ as a Lewis acid, while the Lewis acidity in step (c) can be lowered by the addition of a titanium tetraalkoxide.

Typically, the carbocationically terminated olefin blocks are formed at low temperature from a reaction mixture that comprises: (a) an initiator, (b) a Lewis acid coinitiator, (c) an olefin monomer, (c) an optional proton scavenger and (d) an optional solvent system.

Polymerization can be conducted, for example, within a temperature range of from about 0° C. to about −100° C., more typically from about −50° C. to −90° C. Polymerization times are typically those times that are sufficient to reach 90%, 95%, 99% or even higher conversions of the olefin monomer species to polymer.

Suitable initiators include organic ethers, organic esters, and organic halides. Initiators may be monofunctional, difunctional, trifunctional and so forth, thereby producing, for example, diblock copolymers, triblock copolymers, and radial-shaped block copolymers, respectively. Specific examples include alkyl cumyl ethers, cumyl halides, alkyl cumyl esters, cumyl hydroxyl compounds and hindered versions of the same, for instance, 2-chloro-2,4,4-trimethylpentane, cumyl chloride, dicumyl chloride, 5-tert-butyl, 1,3-dicumyl chloride (i.e., 5-tert-butyl-1,3-bis(1-chloro-1-methylethyl)benzene), and tricumyl chloride (i.e., 1,3,5-tris (1-chloro-1-methylethyl)benzene).

Examples of suitable Lewis acid coinitiators include metal halides and alkyl metal halides such as boron trichloride, titanium tetrachloride and alkyl aluminum halides (e.g., chlorodiethyl aluminum, dichloroethyl aluminum, chlorodimethyl aluminum, dichloromethyl aluminum). One commonly used coinitiator is titanium tetrachloride. The coinitiator is usually used in concentrations equal to or greater than that of initiator, e.g., 1 to 100 times higher, preferably 2 to 40 times higher than that of initiator.

A proton scavenger, typically a Lewis base, is frequently provided to ensure the virtual absence of protic impurities, such as water, which can lead to polymeric contaminants in the final product. Examples of proton scavengers (also referred to as proton traps) include sterically hindered pyridines, for example, substituted or unsubstituted 2,6-di-tert-butylpyridines, such as 2,6-di-tert-butylpyridine and 4-methyl-2,6-di-tert-butylpyridine, as well as 2,6-dimethylpyridine, 1,8-bis(dimethylamino)-naphthalene and diisopropylethyl amine. The proton trap is usually used at the concentration of 1 to 10 times higher than that of protic impurities in the polymerization system.

The various reactions of the present invention are typically carried out in the presence of a solvent system comprising a diluent or mixture of diluents. For the cationic polymerization and end-capping reactions, typical diluents include (a) halogenated hydrocarbons which contain from 1 to 4 carbon atoms per molecule, such as methyl chloride and methylene dichloride, (b) aliphatic hydrocarbons and cycloaliphatic hydrocarbons which contain from 5 to 8 carbon atoms per molecule, such pentane, hexane, heptane, cyclohexane and methyl cyclohexane, or (c) mixtures thereof. For example, in some embodiments, the solvent system contains a mixture of a polar solvent, such as methyl chloride, methylene chloride and the like, and a nonpolar solvent, such as hexane, cyclohexane or methylcyclohexane and the like.

Regardless of the synthesis technique, once a desired living carbocationically terminated polymer is obtained, a capping species that does not homopolymerize under the reaction conditions employed (e.g., the reaction conditions utilized in forming the carbocationically terminated polymer) is contacted with the carbocationically terminated polymer, thereby forming an end-capped carbocationically terminated polymer. Examples of capping species for this purpose include diaryl alkenes such as substituted or unsubstituted diphenyl ethylenes, for instance, diphenyl ethylene or ditolyl ethylene. It is believed that these compounds do not polymerize due to steric hindrance; however, they do form stable carbocations with the carbocationically terminated polyolefin. In general, the diaryl alkylene species is added to the polymerization media in concentrations equal up to about 10 times the concentration of the living chain ends, preferably about 1 to about 5 times the concentration of the living chain ends, even more preferably about 2 times the concentration of the living chain ends. The diaryl alkylene species is allowed to react with the living polymer for a time sufficient to result in practically complete capping.

The resulting end-capped carbocationically terminated polymer is then contacted with at least one protected hydroxystyrene monomer species, under conditions of suitable Lewis acidity, to produce block copolymers in accordance with the present invention. Polymerization times are those sufficient to reach the desired conversion of the protected hydroxystyrene monomer species to polymer, which is typically 80%, 90%, 95%, 99% or more.

As indicated above, when polymerizing the protected hydroxystyrene monomer species, the Lewis acidity is typically reduced relative to the reaction conditions that existed earlier (e.g., the conditions associated with the olefin polymerization and/or end-capping processes). One suitable method for reducing Lewis acidity is to add a metal alkoxide species, for example, a titanium alkoxide species or similar organotitanium species to $TiCl_4$. Typical titanium alkoxide species include $Ti(OR)_4$, wherein R is a branched or unbranched alkyl group containing 1 to 4 carbon atoms, for example, $Ti[OCH(CH_3)_2]_4$ or $Ti[O(CH_2)_3CH_3]$. The amount added generally depends on the reactivity of the protected hydroxystyrene monomer species. By tuning the Lewis acidity, e.g., by adding $Ti(OR)_4$ to reach a desired $TiCl_4/Ti(OR)_4$ ratio, side reactions are minimized, and polymerization is better controlled, leading to high blocking efficiency. Another suitable technique for reducing Lewis acidity is to replace the existing Lewis acid with a weaker Lewis acid. For example, $TiCl_4$ can be replaced with a weaker Lewis acid such as $SnCl_4$. Further information regarding the preparation of block copolymers from monomer species that have significantly different reactivities, can be found, for example, in U.S. Pat. No. 5,428,111, U.S. Pat. No. 5,637,647, and U.S. Pat. No. 5,677,386.

In accordance with another aspect of the invention, at least a portion of the pendant protected hydroxyl groups within the copolymers of the present invention are hydrolyzed, for example, with a strong acid or base, to form pendant hydroxyl groups. Hydrolysis conditions and reaction times are typically sufficient to achieve 90%, 95%, 99% or even higher conversions of the pendant hydrolysable ether groups to alcohol groups.

A variety of block copolymers can be formed using the above techniques. For example, block copolymers of the formula $X(POL-C-PST)_n$ are formed in various embodiments, where X corresponds to the initiator species, C corresponds to the capping species, POL is an olefin block, PST is a styrenic block, and n is a positive whole number. Linear block copolymers are formed where n=1 or n=2. Where n=2, the copolymers are sometimes referred to as triblock copolymers. This terminology disregards the presence of the initiator, for example, treating POL-X-POL as a single olefin block, with the triblock therefore denoted as PST-POL-PST. Star shaped copolymers are formed where n=3 or more. The value of n is typically dictated by the functionality of the initiator molecule, with monofunctional initiators corresponding to n=1, difunctional initiators corresponding to n=2, and so forth. As noted above, the olefin block(s) will contain a plurality of constitutional units that correspond to one or more olefin species, while the styrenic block(s) will contain a plurality of constitutional units that correspond to one or more protected or unprotected hydroxystyrene monomer species.

The invention is further described with reference to the following non-limiting Examples.

EXAMPLES

Characterizations. Molecular weights are measured with a Waters HPLC system equipped with a model 510 HPLC pump, model 410 differential refractometer, model 441 absorbance detector, on-line multiangle laser light scattering (MALLS) detector (MiniDawn, Wyatt Technology Inc.), Model 712 sample processor, and five Ultrastyragel GPC columns connected in the following series: 500, $10^3$, $10^4$, $10^5$, and 100 Å. Tetrahydrofuran (THF) is used as a carrier solvent with a flow rate of 1 mL/min. The composition of the block copolymers are measured by $^1$H NMR spectroscopy using a Bruker 250 MHz instrument. The dn/dc values for homopolymers and block copolymers are measured on an OPTILAB DSP Interferometric Refractometer, using P10 flow cell (1 mm path length).

Materials. Methyl chloride ($CH_3Cl$) and isobutylene (Matheson) are passed through in-line gas purifier columns packed with BaO/Drierite and condensed at −80° C. prior to polymerization. Methylcyclohexane (MeChx) (Aldrich, anhydrous grade), titanium(IV) isopropoxide (Aldrich, 99.999%), titanium (IV) chloride (Aldrich, 99.9%), tetrabutylammonium fluoride (Aldrich, 1.0 M solution in tetrahydrofuran), 2,6-Di-tert-butylpyridine (Aldrich 97%), hydrochloric acid solution (36.5–38.0%, VWR), pyridine (Aldrich, anhydrous grade) and 4-dimethylaminopyridine (Aldrich, 99%) are used as received. 4-(tert-butyldimethylsilyloxy)styrene (TBDMSt) is prepared from 4-acetoxystyrene according to the literature. Hirai, A.; Yamaguchi, K.; Takenaka, K.; Suzuki, K.; Nakahama, S. *Makromol. Chem., Rapid Commun.* 1982, 3, 941. It is freshly distilled from $CaH_2$ in vacuum before the polymerization using phenothiazine (1–2 mg) inhibitor. 4-tert-butoxystyrene (Aldrich, 99%) is distilled in vacuum (p<1 mmHg, b.p. 66–68° C. over $CaH_2$). 2-Chloro-2,4,4-trimethylpentane is prepared by hydrochlorination of 2,4,4-trimethyl-1-pentene (Aldrich, 99%) with hydrogen chloride gas in dry dichloromethane at 0° C. Kaszas, G.; Gyor, M.; Kennedy, J. P.; Tüdös, F. *J. Macromol. Sci., Chem* 1983, A18,1367–1382. The product is dried over $CaCl_2$ and distilled under reduced pressure before use. 5-tert-butyl-1,3-bis(1-chloro-1-methylethyl)benzene is synthesized following the procedure reported in Gyor, M. Wang., H. C.; Faust, R. J. *J. Macromol. Sci., Pure Appl. Chem* 1992, A29, 639. 4,4'-dimethyl-1,1-diphenylethylene (ditolyl ethylene or DTE) is synthesized according to the literature. Hadjikyriacou, S.; Faust, R., *Macromolecules* 1996, 29, 5261. Acetic anhydride is left above $P_2O_5$ overnight, poured off and left above $K_2CO_3$ overnight again, and then it is distilled at atmospheric pressure. The fraction with boiling point between 137–138° C. is collected. Methanol (technical grade) is distilled from sodium methoxide. Tetrahydrofuran (THF) is refluxed for one day above $LiAlH_4$ and distilled before use, or used as received.

Conditions. All experiments are carried out in 75 mL culture tubes under a dry nitrogen atmosphere in an Mbraun 150-M glove box (Inovative Technology Inc., Newburyport, Mass.). Reactions are conducted in a methylcyclohexane (MeChx)/methyl chloride (MeCl), 60/40 v/v, solvent mixture, at −80° C.

Example 1

Polymerization of 4-(tert-butyldimethylsilyloxy)styrene with Different [$TiCl_4$]/[$Ti(OiPr)_4$] Ratios 2-chloro-2,4,4-trimethylpentane (TMPCl) is chosen as a model compound, which mimics the end group structure of tert-chloro-ended PIB. The concentrations are as follows: [4-(tert-butyldimethylsilyloxy)styrene]=0.35 M, [TMPCl]=0.002 M, [2,6-di-tert-butylpyridine, DTBP]=0.006 M, [1,1-ditolylethylene, DTE]=0.004 M. The reagents are added in the following order: MeChx, MeCl, TMPCl (0.5 mL, 0.05 M stock solution in MeChx), DTBP (0.5 mL, 0.15 M stock solution in MeChx), DTE (1.0 mL, 0.05 M stock solution in MeChx/MeCl, 60/40 v/v) and $TiCl_4$ (1.0 mL, 0.454 M stock solution in MeChx/MeCl=60/40). After 1 hour reaction time $Ti(OiPr)_4$ stock solution (0.125 M in MeChx/MeCl, 60/40 v/v) is added and the solution stirred thoroughly. After ~10 minutes 3.0 mL 4-(tert-butyldimethylsilyloxy)styrene monomer stock solution (1.025 g monomer in MeChx/MeCl 60/40 v/v) is added under vigorous stirring. The total volume of the reaction mixture is 12.5 mL. The polymerization is carried out for 1 hour, then it is terminated by prechilled methanol and the reaction mixture is poured into 100 mL methanol. The polymer is purified by re-precipitation from THF into methanol. As Table 1 indicates, ~100% initiator efficiency could be reached with $TiCl_4/Ti(OiPr)_4$=0.036/0.028 ratio.

TABLE 1

| [$TiCl_4$] | [$Ti(OiPr)_4$] | Ratio [$TiCl_4$]/[$Ti(OiPr)_4$] | Yield (%) | $M_n$ | $M_w/M_n$ | $I_{eff}$ (%) |
|---|---|---|---|---|---|---|
| 0.036 | 0.009 | 4 | 100 | 142,800 | 1.80 | 28.7 |
| 0.036 | 0.018 | 2 | 100 | 128,100 | 1.60 | 32.0 |

TABLE 1-continued

| [TiCl$_4$] | [Ti(OiPr)$_4$] | Ratio [TiCl$_4$]/ [Ti(OiPr)$_4$] | Yield (%) | M$_n$ | M$_w$/M$_n$ | I$_{eff}$ (%) |
|---|---|---|---|---|---|---|
| 0.036 | 0.0216 | 1.67 | 100 | 117,700 | 1.75 | 34.8 |
| 0.036 | 0.0252 | 1.43 | 100 | 54,000 | 1.74 | 75.9 |
| 0.036 | 0.028 | 1.28 | 98.0 | 39,100 | 1.29 | 102.8 |
| 0.036 | 0.029 | 1.24 | 32.0 | 13,800 | 1.85 | 94.9 |
| 0.036 | 0.030 | 1.20 | 8.64 | 6000 | 1.36 | 59.1 |
| 0.036 | 0.031 | 1.16 | 7,58 | 6950 | 1.48 | 44.6 |
| 0.036 | 0.032 | 1.12 | 0,8 | — | — | — |
| 0.036 | 0.033 | 1.09 | 0.1 | — | — | — |
| 0.036 | 0.036 | 1 | 0 | — | — | — |

Example 2

Living Character of the Cationic Polymerization of 4-(tert-butyldimethylsilyloxy)styrene Because the polymerization of 4-(tert-butyldimethylsilyloxy)styrene is too fast (e.g., complete within 2 minutes) the change in conversion during the polymerization cannot be followed with gravimetric methods. Therefore the All Monomer In technique was chosen to investigate the livingness of the system. The concentrations in this Example are the following: [TMPCl]=0.002 M, [DTE]=0.004 M, [TiCl$_4$]=0.036 M, [Ti(OiPr)$_4$]=0.028 M. The reagents are added in the following order: MeChx (2.7 mL at room temperature), MeCl (3.0 mL), TMPCl (1.0 mL, 0.05 M in MeChx), DTBP (1.0 mL, 0.15 M in MeChx), DTE (2.0 mL, 0.05 M in MeChx/MeCl, 60/40 v/v) and TiCl$_4$ (2.0 mL, 0.454 M in MeChx/MeCl, 60/40 v/v). After 1 hour reaction time the Ti(OiPr)$_4$ stock solution (5.6 mL, 0.125 M in MeChx/MeCl=60/40 v/v) is added. Under vigorous stirring, 8.0 mL 4-(tert-butyldimethylsilyloxy)styrene monomer solution in MeChx/MeCl 60/40, v/v is poured into the solution. After 30 minutes the reaction is terminated by prechilled methanol, and 25 mL of the resulting mixture is poured into 100 mL methanol. The polymer is purified by re-precipitation from THF into methanol. Table 2 shows that polymers with desired molecular weight can be prepared by varying the monomer/initiator ratio.

TABLE 2

| [Monomer] | Conversion (%) | M$_n$ | M$_w$/M$_n$ | I$_{eff}$ (%) |
|---|---|---|---|---|
| 0.2625 | 100 | 34,500 | 1.37 | 86 |
| 0.35 | 100 | 42,800 | 1.39 | 92 |
| 0.525 | 100 | 59,000 | 1.32 | 100 |
| 0.700 | 100 | 76,500 | 1.26 | 102.7 |

Example 3

Living Character of the Cationic Polymerization of 4-(tert butyl-dimethylsilyloxy)styrene Using DPE Capping Agent The living character of the 4-(tert-butyldimethylsilyloxy)styrene polymerization is also confirmed with 1,1-diphenylethylene (DPE) capping agent. The experiment is carried out the same way as in Example 2 with the exception that 0.01 M DPE is used instead of DTE. The results are summarized in Table 3.

TABLE 3

| [Monomer] | Conversion (%) | M$_n$ | M$_w$/M$_n$ | I$_{eff}$ (%) |
|---|---|---|---|---|
| 0.0875 | 100 | 15,000 | 1.64 | 70.6 |
| 0.175 | 100 | 24,200 | 1.56 | 86.4 |
| 0.2625 | 100 | 33,700 | 1.73 | 94.6 |
| 0.35 | 99.2 | 42,900 | 1.39 | 94.8 |

Example 4

Synthesis of PIB-b-poly(4-tert-butyldimethylsilyloxystyrene) Diblock Copolymer

For the polymerization of IB, the concentrations are the following: [TMPCl]=0.00438 M, [DTBP]=0.01315 M, [IB]=2.342 M, [TiCl]$_4$=0.0789 M. The order of the addition was: MeChx (1.5 mL), MeCl (2.3 mL), TMPCl (0.5 mL, 0.05 M in MeChx), DTBP (0.5 mL, 0.15 M in MeChx), IB (1.04 mL) and TiCl$_4$(1.0 mL, 0.454 M in MeChx/MeCl, 60/40, v/v). IB is polymerized for 90 minutes and then DTE stock solution (1.0 mL, 0.05 M in MeChx/MeCl, 60/40, v/v) is added and the mixture left for 60 minutes. After the capping reaction, Ti(OiPr)$_4$ solution (2.8 mL, 0.125 M in MeChx/MeCl, 60/40, v/v) is added and stirred thoroughly. A solution of 1.464 g 4-(tert-butyldimethylsilyloxy)styrene in MeChx/MeCl 60/40 v/v solvent mixture (3 mL total volume) is poured into the polymerization mixture under vigorous stirring. After 30 minutes the polymerization is quenched by prechilled methanol, and the polymer is precipitated into ~200 mL methanol. The material is left overnight, the solvent is decanted and the polymer dried in vacuum. Table 4 shows the characteristics of the obtained polymer.

TABLE 4

| Designed M$_n$ | | PIB (GPC) | | Diblock (GPC) | | PTBDMSt | |
|---|---|---|---|---|---|---|---|
| PIB | PTBDMSt | M$_n$ | PDI | M$_n$ | PDI | Conv. (%) | Mol % |
| 30,000 | 58,500 | 33,700 | 1.16 | 70,800 | 1.26 | 87.7 | 29.12 |

Note that the GPC trace of the block copolymer smoothly shifted to lower elution volume (higher molecular weights) confirming the formation of block copolymer.

Example 5

Synthesis of Poly(4-tert-butyldimethylsilyloxystyrene)-b-PIB-b-Poly(4-tert-butyldimethylsilyloxystyrene) Triblock Copolymer For the synthesis of poly(4-tert-butyldimethylsilyloxystyrene)-b-PIB-b-poly(4-tert-butyldimethylsilyloxystyrene) triblock copolymers, 5-tert-butyl-1,3-dicumylchloride (t-BudiCumCl) is used as initiator. In the case of sample A and B (Table 5) IB is polymerized using the following concentrations: [t-BudiCumCl]=0.001 M, [IB]=1.60 M, [DTBP]=0.006 M, [TiCl$_4$]=0.036 mol/L. In the case of sample C the concentration of t-BudiCumCl is 0.002 M, and the other concentrations remained the same. The order of the addition was: MeChx (9.7 mL, 8.7 mL in sample C), MeCl (9.2 mL), t-BudiCumCl (1.0 mL, 0.025 M in MeChx, 2.0 mL in case of sample C), DTBP (1.0 mL, 0.15 M in MeChx), IB (3.12 mL) and TiCl$_4$ (2.0 mL, 0.454 M in MeChx/MeCl, 60/40 v/v). IB is polymerized for 90 minutes and then DTE stock solution (1.0 mL, 0.1 M in MeChx/MeCl, 60/40 v/v, 2.0 mL in case of sample C) is added and the mixture left for 60 minutes. After the capping reaction Ti(OiPr)$_4$ solution (2.8 mL, 0.25 M in MeChx/MeCl, 60/40, v/v) is added and stirred thoroughly. 2.928 g (sample A) and 1.464 g (samples B and C) 4-(tert-butyldimethylsilyloxy)styrene monomer are measured out and made up to 7 mL solution in MeChx/MeCl 60/40 v/v solvent mixture and poured into the polymerization mixture under vigorous stirring. The monomer is polymerized for 30 minutes. The polymerization is terminated by prechilled methanol, and the polymer is precipitated into large excess methanol (~200 mL). The precipitation is repeated from THF into methanol. The mixture is left overnight, the solvent is decanted and the polymer is dried in vacuum. Table 5 shows the characteristics of the triblock copolymers.

TABLE 5

| Sample | Designed $M_n$ | | PIB (GPC) | | Triblock (GPC) | | PTBDMSt* | |
|---|---|---|---|---|---|---|---|---|
| | PIB | PTBDMSt | $M_n$ | PDI | $M_n$ | PDI | Conv. (%) | mol % |
| A | 90,000 | 117,100 | 89,500 | 1.07 | 176,300 | 1.10 | 92.7 | 23.0 |
| B | 90,000 | 58,500 | 88,400 | 1.08 | 132,100 | 1.10 | 89.5 | 13.1 |
| C | 45,000 | 29,300 | 48,300 | 1.08 | 74,200 | 1.09 | 90.3 | 13.3 |

*PTBDMSt = poly(4-tert-butyldimethylsilyloxystyrene)

Example 6

Figure 1:
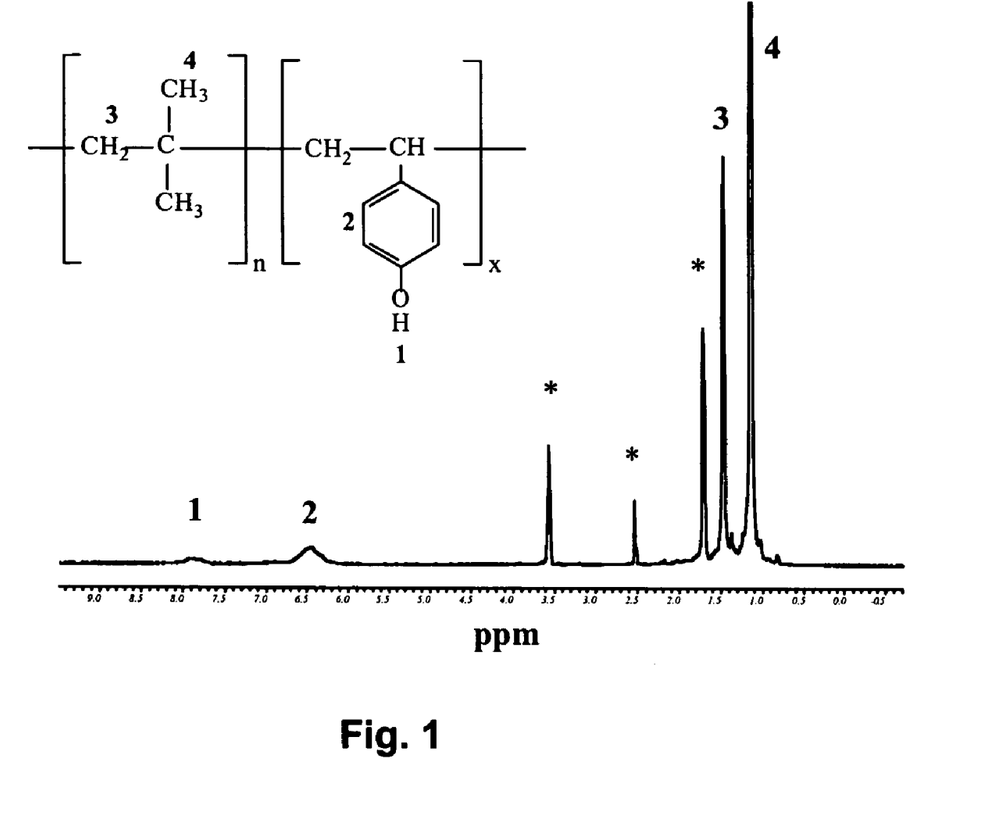
FIG. 1. is a $^1$H NMR spectrum and corresponding structure of poly(4-hydroxystyrene)-b-PIB-b-poly(4-hydroxystyrene).

Hydrolysis of Poly(4-tert-butyldimethylsilyloxystyrene)-b-PIB-b-Poly(4-tert-butyldimethylsilyloxystyrene) Triblock Copolymer 2.5 g triblock ($M_n$=146,000, 87.0 mol % PIB) is dissolved in 250 mL THF (anhydrous) at room temperature. 10 mL tetrabutylammonium fluoride (1.0 M in THF) is added and the solution is refluxed overnight under stirring. The solution is slightly hazy. After 14 hours, the solution is cooled down and precipitated into 1 L water. The precipitation is repeated from THF into 1 L water. The polymer is filtered off, dried in vacuum and extracted with pentane in a Soxhlet Extractor. After the extraction, the polymer is dried again in vacuum. Yield: 1.547 g (75.8%). The $^1$H NMR spectrum shows complete removal of protecting group. See FIG. 1.

Example 7

Cationic Polymerization of 4-tert-Butoxystyrene with Different TiCl$_4$/Ti(OiPr)$_4$ Ratios The reagents are added in the following order: MeChx, MeCl, TMPCl (1.0 mL, 0.05 M in MeChx), DTBP (1.0 mL, 0.15 M in MeChx), DTE (2.0 mL, 0.05 M in MeChx/MeCl, 60/40, v/v) and TiCl$_4$ (2.0 mL, 0.454 M in MeChx/MeCl, 60/40, v/v). After 1 hour reaction time the Ti(OiPr)$_4$ stock solution (2.4–3.6 mL, 0.25 M in MeChx/MeCl, 60/40, v/v) is added. Under vigorous stirring 5.0 mL (1.74 mol/L) 4-tert-butoxystryene monomer stock solution in MeChx/MeCl, 60/40, v/v is added. The volume of MeChx and MeCl is calculated so that the whole volume of the reaction mixture is 25 mL. After 30 minutes the reaction is terminated by prechilled methanol and the solution is poured into 100 mL methanol. The precipitation is repeated once again from THF into methanol. Table 6 shows that the optimum [TiCl$_4$]/[Ti(OiPr)$_4$] ratio is about 0.036/0.030.

TABLE 6

| [TiCl$_4$] | [Ti(O$^i$Pr)$_4$] | Yield (%) | $M_n$ | PDI | $I_{eff}$ (%) |
|---|---|---|---|---|---|
| 0.036 | 0.028 | 93.0 | 47,400 | 1.82 | 62.0 |
| 0.036 | 0.029 | 95.1 | 38,900 | 1.54 | 77.0 |
| 0.036 | 0.030 | 95.0 | 33,100 | 1.33 | 90.7 |
| 0.036 | 0.031 | 94.7 | 35,000 | 1.32 | 85.7 |
| 0.036 | 0.032 | 94.8 | 33,850 | 1.25 | 88.6 |
| 0.036 | 0.033 | 59.6 | 25,600 | 1.28 | 73.4 |
| 0.036 | 0.034 | 31.3 | 22,100 | 1.24 | 44.8 |
| 0.036 | 0.035 | 31.3 | 18,400 | 1.27 | 53.8 |
| 0.036 | 0.036 | 25.5 | 18,000 | 1.25 | 44.4 |

Example 8

Effect of the TiCl$_4$/Ti(O$^i$Pr)$_4$ Ratio on PIB-b-poly(4-tert-butoxystyrene) Diblock Synthesis First a PIB segment with a molecular weight of 30,000 is prepared. The reagents are applied in the following order: MeChx, MeCl, TMPCl (1.0 mL, 0.05 M in MeChx), DTBP (1.0 mL, 0.15 M in MeChx), IB (2.1 mL) and TiC$_4$ (2.0 mL, 0.454 M in MeChx/MeCl, 60/40 v/v). IB is polymerized for 90 minutes. Then DTE stock solution is added (1.0 mL, 0.1 M in MeChx/MeCl, 60/40 v/v), and the mixture is left for 60 minutes. After the capping reaction, Ti(OiPr)$_4$ solution (0.125 M in MeChx/MeCl, 60/40, v/v) is added and stirred thoroughly. Then 5 mL 4-tert-butoxystyrene stock solution in MeChx/MeCl, 60/40, v/v solvent mixture (containing 1.578 g 4-tert-butoxystyrene) is poured into the polymerization mixture under vigorous stirring. The polymerization is quenched by prechilled methanol after 90 minutes, and the polymer is precipitated into ~200 mL methanol. The polymer is purified by repeated precipitation from THF into methanol. The characteristics of the polymers are shown in Table 7.

TABLE 7

| [TiCl$_4$] | [Ti(OiPr)$_4$] | Conv. of TBDMSt | $M_n$ | $M_w/M_n$ |
|---|---|---|---|---|
| 0.036 | 0.022 | 91.0 | | bimodal |
| 0.036 | 0.025 | 93.3 | | bimodal |
| 0.036 | 0.028 | 88.3 | 62,000 | 1.54 |
| 0.036 | 0.030 | 85.7 | 58,900 | 1.17 |
| 0.036 | 0.032 | 38.9 | 42,700 | 1.16 |
| 0.036 | 0.034 | 22.4 | 36,400 | 1.14 |

Example 9

Synthesis of Poly(4-tert-butoxystyrene)-b-PIB-b-poly(4-tert-butoxystyrene) Triblocks For the Synthesis of poly(4-tert-butoxystyrene)-b-PIB-b-poly(4-tert-butoxystyrene) triblock copolymers, t-BudiCumCl is used as initiator. In the case of samples A and B (Table 8) the isobutylene is polymerized under the following concentrations: [t-BudiCumCl]=0.001 M, [IB]=1.60 M, [DTBP]=0.006 M, [TiCl$_4$]=0.036 mol/L. In the case of sample C, [tBudiCumCl]=0.002 M, while the other concentrations are the same. The order of the addition is: MeChx (9.7 mL, 8.7 mL in the case of C), MeCl (9.2 mL), t-BudiCumCl (1.0 mL, 0.025 M in MeChx, 2.0 mL in the case of C), DTBP (1.0 mL, 0.15 M in MeChx), 113 (3.12 mL) and TiCl$_4$ (2.0 mL, 0.454 M in MeChx/MeCl, 60/40, v/v). IB is polymerized for 90 minutes and then DTE stock solution (1.0 mL, 0.1 M in MeChx/MeCl, 60/40 v/v, 2.0 mL in the case of C) is added and the mixture is left for 60 minutes. After the capping reaction, Ti(OiPr)$_4$ solution (2.8 mL, 0.25 M in MeChx/MeCl, 60/40, v/v) is added and stirred thoroughly. 1.5 g (2.5 g in the case of A) 4-tert-butoxystyrene is dissolved in MeChx/MeCl, 60/40 v/v, solvent mixture (total volume 5 mL) and poured into the polymerization mixture under vigorous stirring. After 1 hour polymerization, prechilled methanol is added to quench the reaction, and the polymer is precipitated into ~200 mL methanol. The polymer is purified by re-precipitation from THF into methanol. Table 5 shows the characteristics of different molecular weight triblock copolymers.

TABLE 8

| Sample | Designed M$_n$ | | PIB (GPC) | | Triblock (GPC) | | PTBST | |
|---|---|---|---|---|---|---|---|---|
| | PIB | PTBST | M$_n$ | PDI | M$_n$ | PDI | Conv. (%) | mol % |
| A | 90,000 | 100,000 | 91,100 | 1.07 | 173,700 | 1.10 | 91.2 | 25.9 |
| B | 90,000 | 60,000 | 93,000 | 1.07 | 147,200 | 1.10 | 88.5 | 17.71 |
| C | 45,000 | 30,000 | 49,400 | 1.08 | 79,400 | 1.10 | 89.5 | 17.6 |

*PTBST stands for poly(4-tert-butoxystyrene)

Example 10

Hydrolysis of poly(4-tert-butoxystyrene)-b-PIB-b-poly(4-tert-butoxystyrene) triblock 834 mg triblock (sample A in Table 8) is dissolved in 50 mL THF and then 2 mL HCl acid (37.0%) is added. The solution is refluxed for 3 hours and then cooled down and precipitated into 400 mL water which contains 1 mL ammonia solution (30%). The resulting polymer is filtered off, washed with water, and dried in vacuum. Yield: 584.6 mg (83%). $^1$H NMR spectroscopy showed complete hydrolysis (absence of a tert-butyl group).

Example 11

Acetylation of Poly(4-hydroxystyrene-b-IB-b-4-hydroxystyrene) Triblock 1 g copolymer from Example 6 is dissolved in 15 mL anhydrous THF. Then, 1.42 mL (15 mmol) distilled acetic anhydride, 1.21 mL (15 mmol) pyridine and 122 mg (1 mmol) 4-dimethylaminopyridine are added. The resulting homogenous solution is left for one day at room temperature. The polymer solution is poured into water (200 mL) and the precipitated polymer is washed thoroughly with water, filtered and dried in vacuum. $^1$H NMR spectroscopy showed complete esterification. Yield: 0.995 g (91.3%).

Although various embodiments are specifically illustrated and described herein, it will be appreciated that modifications and variations of the present invention are covered by the above teachings and are within the purview of the appended claims without departing from the spirit and intended scope of the invention.

The invention claimed is:

1. A copolymer comprising a plurality of constitutional units that correspond to one or more olefin monomer species; a plurality of constitutional units that correspond to one or more protected or unprotected hydroxystyrene monomer species; and a capping species, wherein the capping species is located between at least one of the olefin monomer species and at least one of the protected or unprotected hydroxystyrene monomer species.

2. The copolymer of claim 1, wherein said one or more olefin monomer species are selected from isomonoolefins containing 4 to 18 carbon atoms per molecule and multi-olefins containing 4 to 14 carbon atoms per molecule.

3. The copolymer of claim 1 wherein said one or more olefin monomer species are selected from isobutylene, 2-methylbutene, isoprone, 3-methyl-1-butene, 4-methyl-1-pentene and beta-pinene.

4. The copolymer of claim 1, wherein said one or more olefin monomer species comprise isobutylene.

5. The copolymer of claim 1, wherein said one or more protected or unprotected hydroxystyrene monomer species comprise a hydroxystyrene species.

6. The copolymer of claim 1, wherein said one or more protected or unprotected hydroxystyrene monomer species comprise a protected hydroxystyrene monomer species.

7. The copolymer of claim 6, wherein said protected hydroxystyrene monomer species are selected from tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene.

8. The copolymer of claim 1, wherein said one or more olefin monomer species comprise isobutylene, and wherein said one or more protected or unprotected hydroxystyrene monomer species comprise a hydroxystyrene species.

9. The copolymer of claim 1, wherein said one or more olefin monomer species comprise isobutylene, and wherein said one or more protected or unprotected hydroxystyrene monomer species comprise a protected hydroxystyrene monomer species.

10. The copolymer of claim 1, wherein said copolymer is a block copolymer comprising: an olefin block that comprises a plurality of constitutional unit, corresponding to said one or more olefin monomer species; a styrenic block that comprise a plurality of constitutional units corresponding to said one or more protected or unprotected hydroxystyrene monomer species; and a capping species, wherein the capping species is located between the olefin block and the styrenic block.

11. The copolymer of claim 10, wherein said one or more olefin monomer species are selected from isomonoolefins containing 4 to 18 carbon atoms per molecule and multiolefins containing 4 to 14 carbon atoms per molecule.

12. The copolymer of claim 10, wherein said one or more olefin monomer species are selected from isobutylene, 2-methylbutene, isoprene, 3-methyl-1-butane, 4-methyl-1-pentene and beta-pinene.

13. The copolymer of claim 10, wherein said one or more protected or unprotected hydroxystyrene monomer species comprise a hydroxystyrene species.

14. The copolymer of claim 10, wherein said one or more protected or unprotected hydraxystyrene monomer species comprise a protected hydroxystyrene monomer species.

15. The copolymer of claim 14, wherein said protected hydroxystyrene monomer species are selected from tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene.

16. The copolymer of claim 10, wherein said one or more olefin monomer species comprise isobutylene, and wherein said one or more protected or unprotected hydroxystyrene monomer species comprise a hydraxystyrene species.

17. The copolymer of claim 10, wherein said one or more olefin monomer species are selected from isomonoolefins containing 4 to 18 carbon atoms per molecule and multiolefins containing 4 to 14 carbon atoms per molecule, and wherein said one or more protected or unprotected hydroxystyrene monomer species comprise a protected hydroxystyrene monomer species.

18. The copolymer of claim 17, wherein said one or more olefin monomer species comprise isobutylene, end wherein said protected hydroxystyrene monomer species are selected from tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene.

19. The copolymer of claim 10, wherein said block copolymer is of the formula X(POL-C-PST)$_n$, where X corresponds to an initiator species, C corresponds to a capping species, POL is said olefin block that comprises a plurality of constitutional units corresponding to said one or more olefin monomer species, PST is said styrenic block that comprise a plurality of constitutional units corresponding to said one or more protected or unprotected hydroxystyrene monomer species, and n is a positive whole number ranging from 1 to 5.

20. The copolymer of claim 19, wherein said one or more olefin monomer species are selected from isomonoolefins containing 4 to 18 carbon atoms per molecule and multiolefins containing 4 to 14 carbon atoms per molecule.

21. The copolymer of claim 19, wherein said one or more olefin monomer species are selected from isobutylene, 2-methylbutene, isoprene, 3-methyl-1-butane, 4-methyl-1-pentene, beta-pinene.

22. The copolymer of claim 19, wherein said one or more protected or unprotected hydroxystyrene monomer species comprise a hydroxystyrene species.

23. The copolymer of claim 19, wherein said one or more protected or unprotected hydroxystyrene monomer species comprise a protected hydroxystyrene monomer species.

24. The copolymer of claim 23, wherein maid protected hydroxystyrene monomer species is selected from tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene.

25. The copolymer of claim 19, wherein said one or more olefin monomer species comprise isobutylene, and wherein said one or more protected or unprotected hydroxystyrene monomer species comprise a hydroxystyrene species.

26. The copolymer of claim 19, wherein said one or more olefin monomer species comprise isobutylene, and wherein said one or more protected or unprotected hydroxystyrene monomer species comprise a protected hydroxystyrene monomer species.

27. The copolymer of claim 26, wherein said protected hydroxystyrene monomer species is selected from tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene.

28. The copolymer of claim 19, wherein n=1, 2 or 3.

29. The copolymer of claim 19, wherein said initiator species corresponds to an organic ether, an organic ester, an organic alcohol and an organic halide.

30. The copolymer of claim 19, wherein said initiator species corresponds to 2,4,4-trimethylpentyl chloride or tert-butyl-dicumylchloride.

31. The copolymer of claim 19, wherein said capping species corresponds to a substituted or unsubstituted diphenyl ethylene species.

32. A method of making the block copolymer of claim 10, comprising:
(a) providing a carbocationically terminated polymer comprising said one or more olefin blocks;
(b) contacting under reaction conditions said carbocationically terminated polymer with a capping species that does not homopolymerize under said reaction conditions, thereby forming an end-capped carbocationically terminated polymer; and
(c) contacting said end-capped carbocationically terminated polymer with protected hydroxystyrene monomer species under reaction conditions having lower Lewis acidity than the reaction conditions of step (b), thereby providing a block copolymer.

33. The method of claim 32, wherein the Lewis acidity in step (b) comprises TiCl$_4$, and wherein the Lewis acidity in step (c) is lowered by the addition of a titanium tetraalkoxide species.

34. The method of claim 32, wherein said reaction conditions comprises a temperature between −50° C. and −90° C.

35. The method of claim 32, wherein said carbocationically terminated polymer is formed under reaction conditions from a reaction mixture that comprises: (i) a solvent system, (ii) monomer species selected from isomonoolefins containing 4 to 18 carbon atoms per molecule and multiolefins containing 4 to 14 carbon atoms per molecule, (iii) an initiator selected from an organic ether, an organic ester, an organic alcohol, and an organic halide, and (iv) a Lewis acid.

36. The method of claim 32, further comprising hydrolyzing at least a portion of the constitutional units in said block copolymer that correspond to said protected hydroxystyrene monomer species, thereby forming alcohol groups.

* * * * *